US010676093B2

(12) United States Patent
Nishiguchi

(10) Patent No.: US 10,676,093 B2
(45) Date of Patent: Jun. 9, 2020

(54) VEHICLE CONTROL SYSTEM, VEHICLE CONTROL METHOD, AND STORAGE MEDIUM

(71) Applicant: HONDA MOTOR CO., LTD., Minato-ku, Tokyo (JP)

(72) Inventor: Haruhiko Nishiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/106,096

(22) Filed: Aug. 21, 2018

(65) Prior Publication Data

US 2019/0061766 A1 Feb. 28, 2019

(30) Foreign Application Priority Data

Aug. 29, 2017 (JP) ................................. 2017-164745

(51) Int. Cl.
*B60W 30/18* (2012.01)
*B62D 15/02* (2006.01)
*G05D 1/02* (2020.01)

(52) U.S. Cl.
CPC ... *B60W 30/18163* (2013.01); *B62D 15/0255* (2013.01); *B60W 2554/00* (2020.02);
(Continued)

(58) Field of Classification Search
CPC ..... B60W 30/18163; B60W 2720/125; B60W 2550/10; B60W 2550/30; B62D 15/0255; G05D 1/0246; G05D 2201/0213
See application file for complete search history.

(56) References Cited

U.S. PATENT DOCUMENTS 8,520,695 B1 * 8/2013 Rubin ...................... G08G 9/02
370/445
9,836,056 B2 * 12/2017 Ansari ................ G05D 1/0212
(Continued)

FOREIGN PATENT DOCUMENTS

JP 2012-226392 11/2012
JP 2016-000602 1/2016
(Continued)

OTHER PUBLICATIONS

Japanese Office Action for Japanese Patent Application No. 2017-164745 dated Mar. 26, 2019.

*Primary Examiner* — Behrang Badii
*Assistant Examiner* — Daniel L Greene
(74) *Attorney, Agent, or Firm* — Amin, Turocy & Watson, LLP

(57) ABSTRACT

A vehicle control system includes a recognition unit configured to recognize a situation in the surroundings of a vehicle, a lane change control unit configured to cause a lane of the vehicle to be changed from a first lane to a second lane without depending upon a steering operation of an occupant of the vehicle, and a determination unit configured to determine whether or not a nearby vehicle travelling in a lane adjacent to the second lane and the vehicle are in a parallel traveling state in a case that the lane of the vehicle is changed to the second lane by the lane change control unit on the basis of the situation in the surroundings recognized by the recognition unit, wherein the lane change control unit causes control details of the lane change to be different between a case in which the determination unit determines that the nearby vehicle and the vehicle are in the parallel traveling state and a case in which the determination unit determines that the nearby vehicle and the vehicle are not in the parallel traveling state.

11 Claims, 10 Drawing Sheets

(52) U.S. Cl.
CPC ... *B60W 2554/80* (2020.02); *B60W 2720/125* (2013.01); *G05D 1/0246* (2013.01); *G05D 2201/0213* (2013.01)

(56) References Cited

U.S. PATENT DOCUMENTS

| | | | |
|---|---|---|---|
| 2003/0097206 A1* | 5/2003 | Matsumoto | B60T 8/17557 701/1 |
| 2004/0246119 A1* | 12/2004 | Martin | B60Q 1/40 340/476 |
| 2007/0106475 A1* | 5/2007 | Kondoh | B60K 26/021 701/301 |
| 2016/0003636 A1* | 1/2016 | Ng-Thow-Hing | H04N 7/188 701/26 |
| 2016/0046290 A1* | 2/2016 | Aharony | G06K 9/00798 701/41 |
| 2016/0231746 A1* | 8/2016 | Hazelton | G05D 1/0257 |
| 2016/0318490 A1* | 11/2016 | Ben Shalom | B60T 7/12 |
| 2016/0347322 A1* | 12/2016 | Clarke | B60W 30/00 |
| 2017/0008521 A1* | 1/2017 | Braunstein | G01C 21/32 |
| 2017/0243485 A1* | 8/2017 | Rubin | H04W 72/005 |
| 2017/0259819 A1* | 9/2017 | Takeda | B60W 10/04 |
| 2017/0352200 A1* | 12/2017 | Wang | G08G 1/163 |
| 2018/0009374 A1* | 1/2018 | Kim | G03B 21/206 |
| 2018/0178713 A1* | 6/2018 | Fujii | B60Q 1/346 |
| 2018/0188060 A1* | 7/2018 | Wheeler | G01C 21/3635 |

FOREIGN PATENT DOCUMENTS

| | | |
|---|---|---|
| JP | 2017-061249 | 3/2017 |
| JP | 2017-100534 | 6/2017 |

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-164745, filed Aug. 29, 2017, the content of which is incorporated herein by reference.

BACKGROUND OF THE INVENTION

Field of the Invention

The present invention relates to a vehicle control system, a vehicle control method, and a storage medium.

Description of Related Art

Conventionally, technology for suppressing a lane change when a vehicle that is an obstacle to a lane change is in a target lane and releasing the suppression of the lane change after waiting until there are no vehicles that are obstacles to perform the lane change is known (e.g., Japanese Unexamined Patent Application, First Publication No. 2012-226392).

SUMMARY OF THE INVENTION

However, in the conventional technology, a traveling state of a nearby vehicle traveling in a lane adjacent to a changed lane is not considered and a nearby vehicle or an occupant of a host vehicle is often not sufficiently considered.

An aspect of the present invention has been made in view of the above circumstances and an objective of the aspect of the present invention is to provide a vehicle control system, a vehicle control method, and a storage medium capable of executing a lane change in consideration of a nearby vehicle or an occupant.

In a vehicle control system, a vehicle control method, and a storage medium according to the present invention, the following configuration is adopted.

(1): A vehicle control system according to an aspect of the present invention is a vehicle control system including: a recognition unit configured to recognize a situation in the surroundings of a vehicle; a lane change control unit configured to cause a lane of the vehicle to be changed from a first lane to a second lane without depending upon a steering operation of an occupant of the vehicle; and a determination unit configured to determine whether or not a nearby vehicle travelling in a lane adjacent to the second lane and the vehicle are in a parallel traveling state in a case that the lane change control unit changes the lane of the vehicle to the second lane on the basis of the situation in the surroundings recognized by the recognition unit, wherein the lane change control unit causes control details of the lane change to be different between a case in which the determination unit determines that the nearby vehicle and the vehicle are in the parallel traveling state and a case in which the determination unit determines that the nearby vehicle and the vehicle are not in the parallel traveling state.

(2): In the aspect (1), the lane adjacent to the second lane is an adjacent third lane opposite the first lane when viewed from the second lane.

(3): In the aspect (1), the lane change control unit starts steering control of the vehicle when a predetermined time has elapsed from activation of a direction indicator of the vehicle, and the lane change control unit changes the predetermined time in a case that the determination unit determines that the vehicle and the nearby vehicle are in the parallel traveling state.

(4): In the aspect (3), the recognition unit recognizes a relative speed between the vehicle and the nearby vehicle, and the lane change control unit makes the predetermined time when an absolute value of the relative speed is greater than a predetermined speed longer than the predetermined time in a case that the determination unit determines that the vehicle and the nearby vehicle are not in the parallel traveling state.

(5): In the aspect (1), the lane change control unit makes lateral acceleration caused due to the lane change in a case that the determination unit determines that the vehicle and the nearby vehicle are in the parallel traveling state less than lateral acceleration caused due to the lane change in a case that the determination unit determines that the vehicle and the nearby vehicle are not in the parallel traveling state.

(6): In the aspect (5), the recognition unit recognizes a relative speed between the vehicle and the nearby vehicle, and the lane change control unit makes the lateral acceleration in a case that an absolute value of the relative speed is less than or equal to a predetermined speed less than the lateral acceleration in a case that the determination unit determines that the vehicle and the nearby vehicle are not in the parallel traveling state.

(7): In the aspect (1), the lane change control unit changes the lane of the vehicle from the first lane to the second lane at a predetermined speed according to speed control for the vehicle and causes a speed related to a traveling direction during the lane change in a case that the determination unit determines that the vehicle and the nearby vehicle are in the parallel traveling state to be different from a speed in a case that the determination unit determines that the vehicle and the nearby vehicle are not in the parallel traveling state.

(8): In the aspect (7), the recognition unit recognizes a relative speed between the vehicle and the nearby vehicle, and the lane change control unit makes a speed of the vehicle during the lane change in a case that an absolute value of the relative speed is less than or equal to a predetermined speed less than a speed of the vehicle in a case that the determination unit determines that the vehicle and the nearby vehicle are not in the parallel traveling state.

(9): In the aspect (1), the lane change control unit changes a traveling position related to a lane width direction in the second lane after a lane change of the vehicle controlled by the lane change control unit in a case that the determination unit determines that the vehicle and the nearby vehicle are in the parallel traveling state to a position further from the nearby vehicle than in a case that the determination unit determines that the vehicle and the nearby vehicle are not in the parallel traveling state.

(10): According to an aspect of the present invention, there is provided a vehicle control method including: recognizing, by an in-vehicle computer, a situation in the surroundings of a vehicle; changing, by the in-vehicle computer, a lane of the vehicle from a first lane to a second lane without depending upon a steering operation of an occupant of the vehicle; determining, by the in-vehicle computer, whether or not a nearby vehicle travelling in a lane adjacent to the second lane and the vehicle are in a parallel traveling state in a case that the lane of the vehicle is changed to the second lane on the basis of the recognized situation in the surroundings; and causing, by the in-vehicle computer, control details of the lane change to be different between a case in which it is determined that the nearby vehicle and the vehicle are in the parallel traveling state and a case in which it is determined that the nearby vehicle and the vehicle are not in the parallel traveling state.

(11): According to an aspect of the present invention, there is provided a non-transitory computer-readable storage medium storing a program for causing an in-vehicle computer to: recognize a situation in the surroundings of a vehicle; change a lane of the vehicle from a first lane to a second lane without depending upon a steering operation of an occupant of the vehicle; determine whether or not a nearby vehicle travelling in a lane adjacent to the second lane and the vehicle are in a parallel traveling state in a case that the lane of the vehicle is changed to the second lane on the basis of the recognized situation in the surroundings; and cause control details of the lane change to be different between a case in which it is determined that the nearby vehicle and the vehicle are in the parallel traveling state and a case in which it is determined that the nearby vehicle and the vehicle are not in the parallel traveling state.

According to the aspects (1) to (11), it is possible to execute a lane change in consideration of a nearby vehicle or an occupant.

DETAILED DESCRIPTION OF THE INVENTION

Hereinafter, embodiments of a vehicle control system, a vehicle control method, and a storage medium of the present invention will be described with reference to the drawings.

[Overall Configuration]

Figure 1:
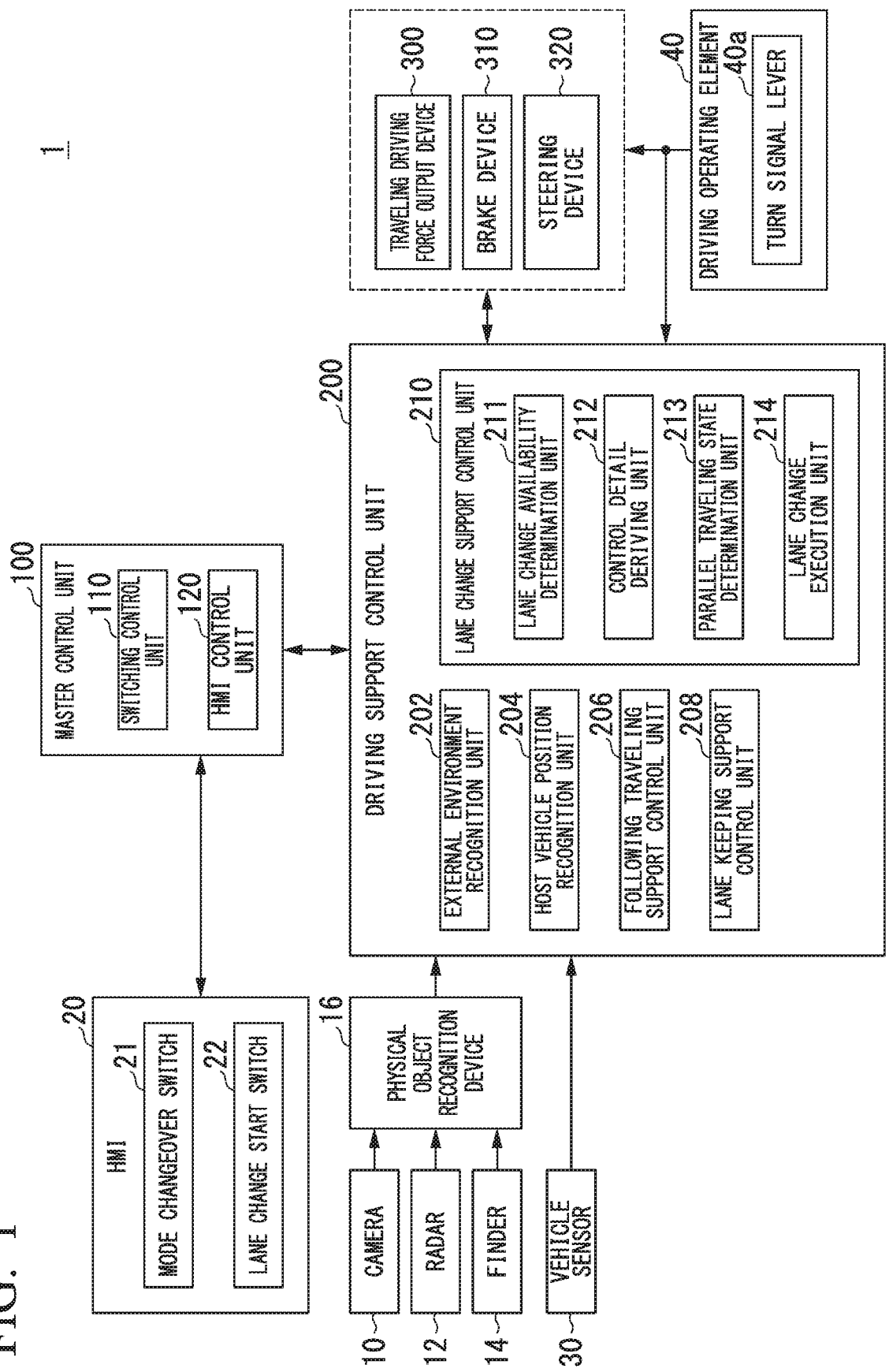
FIG. 1 is a configuration diagram of a vehicle control system of an embodiment.

FIG. 1 is a configuration diagram of a vehicle control system 1 according to the embodiment. A vehicle in which the vehicle control system 1 is mounted (hereinafter referred to as a host vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a power generator connected to the internal combustion engine, or discharge power of a secondary battery or a fuel cell.

The vehicle control system 1 includes, for example, a camera 10, a radar 12, a finder 14, a physical object recognition device 16, a human machine interface (HMI) 20, a vehicle sensor 30, a driving operating element 40, a master control unit 100, a driving support control unit 200, a traveling driving force output device 300, a brake device 310, and a steering device 320. These devices and apparatuses are connected to each other through a multiplex communication line such as a controller area network (CAN) communication line, a serial communication line, a wireless communication network, or the like. The configuration illustrated in FIG. 1 is merely an example, and parts of the configuration may be omitted, or other configurations may be further added.

The camera 10 is, for example, a digital camera using a solid-state imaging device such as a charge coupled device (CCD) or a complementary metal oxide semiconductor (CMOS). One or more cameras 10 are attached to any positions of a host vehicle M. To capture an image in a forward direction, the camera 10 is attached to an upper portion of a front windshield, a rear surface of a rearview mirror, or the like. For example, the camera 10 periodically and iteratively images the surroundings of the host vehicle M. The camera 10 may be a stereo camera.

The radar 12 radiates radio waves such as millimeter waves around the host vehicle M and detects at least a position (a distance and a direction) of a physical object by detecting radio waves (reflected waves) reflected by the physical object. One or more radars 12 are attached to any positions on the host vehicle M. The radar 12 may detect a position and speed of the physical object in a frequency modulated continuous wave (FM-CW) scheme.

The finder 14 is light detection and ranging or laser imaging detection and ranging (LIDAR) in which scattered light from irradiation light is measured and a distance to an object is detected. One or more finders 14 are attached to any positions on the host vehicle M.

The physical object recognition device 16 performs a sensor fusion process on detection results from some or all of the camera 10, the radar 12, and the finder 14 to recognize a position, a type, a speed, a movement direction, and the like of a physical object. Physical objects to be recognized are types of physical objects such as, for example, vehicles, guardrails, electric poles, pedestrians, and road signs. The physical object recognition device 16 may output a recognition result to the driving support control unit 200. The physical object recognition device 16 may output some of the information input from the camera 10, the radar 12, or the finder 14 to the driving support control unit 200 as it is.

The HMI 20 presents various types of information to the occupant of the host vehicle M and receives an input operation by the occupant. The HMI 20 includes various display devices such as a liquid crystal display (LCD) and an organic electro luminescence (EL) display, various buttons such as a mode changeover switch 21 and a lane change start switch 22, a speaker, a buzzer, a touch panel, and the like. Each device of the HMI 20 is attached at any position of, for example, a part of an instrument panel, a passenger seat, or a rear seat.

The mode changeover switch 21 is, for example, a switch for performing switching between a driving support mode and a manual operation mode. The driving support mode is, for example, a mode in which one or both of a set of the traveling driving force output device 300 and the brake device 310 and the steering device 320 are controlled by the driving support control unit 200. The manual operation mode is a mode in which the traveling driving force output device 300, the brake device 310, and the steering device 320 are controlled in accordance with an amount of operation of the driving operating element 40.

The lane change start switch 22 is a switch for starting lane change control for causing the host vehicle M to change lanes without depending on the steering operation by the occupant at the time of execution of the driving support mode. The steering operation is, for example, an operation performed on a steering operating element such as a steering wheel included in the driving operating element 40. As a steering operating element, a joystick, a gesture recognition device, and the like can also be used. The lane change control involves controlling one or both of the steering control and the speed control of the host vehicle M to cause the lane of the host vehicle M to be automatically changed to a target lane. The lane change start switch 22 may receive a direction (right or left) for changing the lane of the host vehicle M to which an instruction is provided by the occupant.

The vehicle sensor 30 includes, for example, a vehicle speed sensor configured to detect a speed of the host vehicle M, an acceleration sensor configured to detect acceleration, a yaw rate sensor configured to detect an angular velocity around the vertical axis, a direction sensor configured to detect an orientation of the host vehicle M, and the like. The speed includes, for example, at least one of a longitudinal speed related to the traveling direction of the host vehicle M and a lateral speed related to the lateral direction of the host vehicle M. For example, the acceleration includes at least one of longitudinal acceleration related to the traveling direction of the host vehicle M and lateral acceleration related to the lateral direction of the host vehicle M. Each sensor included in the vehicle sensor 30 outputs a detection signal indicating a detection result to the driving support control unit 200.

The driving operating element 40 includes, for example, the above-described steering wheel, a turn signal lever 40a configured to activate a turn signal (a direction indicator), and various operating elements such as an accelerator pedal, a brake pedal, and a shift lever. For each operation element of the driving operating element 40, for example, an operation detection unit configured to detect an amount of operation by an occupant is attached. The operation detection unit detects a position of the turn signal lever 40a, an amount of depression of an accelerator pedal and a brake pedal, a position of a shift lever, a steering angle or steering torque of the steering wheel, and the like. Then, the operation detection unit outputs a detection signal indicating the detection result to one or both of the driving support control unit 200 or a set of the traveling driving force output device 300, the brake device 310, and the steering device 320.

[Configuration of Master Control Unit]

The master control unit 100 includes, for example, a switching control unit 110 and an HMI control unit 120. These components are implemented, for example, by a hardware processor such as a central processing unit (CPU) executing a program (software). Some or all of these components may be implemented by hardware (a circuit unit including circuitry) such as large scale integration (LSI), an application specific integrated circuit (ASIC), a field-programmable gate array (FPGA), or a graphics processing unit (GPU) or may be implemented by software and hardware in cooperation.

The switching control unit 110 switches the operation mode of the host vehicle M between the manual operation mode and the driving support mode on the basis of the detection signal output by operating the mode changeover switch 21 and the lane change start switch 22.

If the operation mode of the host vehicle M is the manual operation mode, a detection signal of the driving operating element 40 (a detection signal indicating a degree of an amount of operation of each operating element) is input to the traveling driving force output device 300, the brake device 310, and the steering device 320. At this time, the input signal input from the driving operating element 40 may be indirectly output to the traveling driving force output device 300, the brake device 310, and the steering device 320 via the driving support control unit 200.

If the driving mode of the host vehicle M is the driving support mode, control signals (signals indicating amounts of control of the devices) are input from the driving support control unit 200 to the traveling driving force output device 300, the brake device 310, and the steering device 320.

For example, if the operation mode of the host vehicle M is switched by the switching control unit 110, the HMI control unit 120 causes the display device, the speaker, or the like of the HMI 20 to output information related to switching of the mode.

Before description of the driving support control unit 200, the traveling driving force output device 300, the brake device 310, and the steering device 320 will be described. The traveling driving force output device 300 outputs a traveling driving force (torque) for the host vehicle M to travel to the driving wheels. The traveling driving force output device 300 includes, for example, a combination of an internal combustion engine, an electric motor, a transmission, and the like, and a power electronic control unit (ECU) configured to control them. The power ECU controls the above-described configuration in accordance with information input from the driving support control unit 200 or information input from the driving operating element 40.

The brake device 310 includes, for example, a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the driving support control unit 200 or the information input from the driving operating element 40 so that a brake torque in response to a braking operation is output to each wheel. The brake device 310 may include a mechanism for transferring a hydraulic pressure generated through an operation of the brake pedal included in the driving operating element 40 to a cylinder via a master cylinder as a backup. The brake device 310 is not limited to the above-described configuration, but may be an electronically controlled hydraulic brake device configured to control an actuator in accordance with information input from the driving support control unit 200 and transfer the hydraulic pressure of the master cylinder to the cylinder.

The steering device 320 includes, for example, a steering ECU and an electric motor. The electric motor changes, for example, the orientation of the steerable wheels by applying a force to a rack and pinion mechanism. The steering ECU drives the electric motor in accordance with the information input from the driving support control unit 200 or the information input from the driving operating element 40 and causes the electric motor to change the orientation of the steerable wheels.

[Configuration of Driving Support Control Unit]

The driving support control unit 200 includes, for example, an external environment recognition unit 202, a host vehicle position recognition unit 204, a following traveling support control unit 206, a lane keeping support control unit 208, and a lane change support control unit 210. These components are implemented, for example, by a hardware processor such as a CPU executing a program (software). Some or all of these components may be implemented by hardware (a circuit unit including circuitry) such as LSI, an ASIC, an FPGA, and a GPU or may be implemented by software and hardware in cooperation. A combination of the external environment recognition unit 202 and the host vehicle position recognition unit 204 is an example of a "recognition unit." The lane change support control unit 210 is an example of a "lane change control unit." A parallel traveling state determination unit 213 is an example of a "determination unit."

On the basis of the information input from the camera 10, the radar 12, and the finder 14 via the physical object recognition device 16, the external environment recognition unit 202 recognizes states such as the position, speed, and acceleration of nearby vehicles. The position of a nearby vehicle may be indicated by a representative point such as a center of gravity or a corner of the nearby vehicle or may be indicated by a region represented by an outline of the nearby vehicle. The "state" of the nearby vehicle may include acceleration or a jerk of the nearby vehicle, or an "action state" thereof (e.g., whether or not the vehicle is performing an acceleration lane change or attempting to perform an acceleration lane change). Also, the external environment recognition unit 202 may recognize states of other physical objects such as guardrails, electric poles, parked vehicles, and pedestrians in addition to nearby vehicles.

For example, the host vehicle position recognition unit 204 recognizes a lane in which the host vehicle M is traveling (a traveling lane) and a position and orientation of the host vehicle M relative to the traveling lane. For example, the host vehicle position recognition unit 204 recognizes lane markings LM of a road from an image captured by the camera 10 and recognizes a lane partitioned by two lane markings LM closest to the host vehicle M among the recognized lane markings LM as a traveling lane. Then, the host vehicle position recognition unit 204 recognizes the position and orientation of the host vehicle M with respect to the recognized traveling lane.

Figure 2:
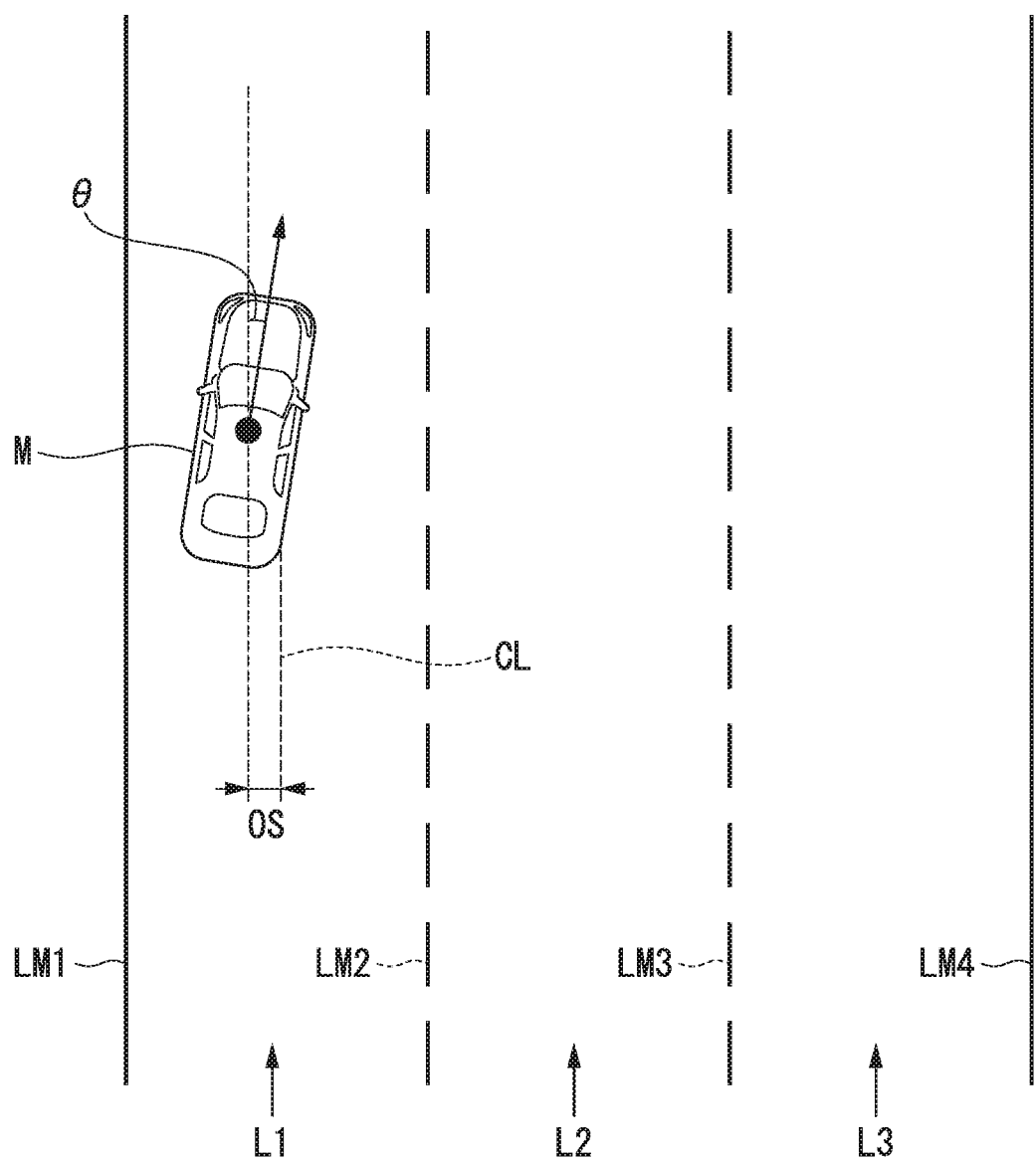
FIG. 2 is a diagram showing a state in which a relative position and an orientation of a host vehicle M for a traveling lane are recognized by a host vehicle position recognition unit.

FIG. 2 is a diagram showing a state in which a relative position and orientation of the host vehicle M relative to the traveling lane L1 are recognized by the host vehicle position recognition unit 204. For example, the host vehicle position recognition unit 204 recognizes lane markings LM1 to LM4 and recognizes a region between the lane markings LM1 and LM2 closest to the host vehicle M as the traveling lane (host lane) L1 of the host vehicle M. Then, the host vehicle position recognition unit 204 recognizes a deviation OS from a traveling lane center CL of a reference point (e.g., a center of gravity) of the host vehicle M and an angle θ formed with respect to a line connected to the traveling lane center CL in a traveling direction of the host vehicle M as the position and the orientation of the host vehicle M relative to the traveling lane L1. Alternatively, the host vehicle position recognition unit 204 may recognize a position of the reference point of the host vehicle M or the like with respect to one side end of the traveling lane L1 as a position of the host vehicle M relative to the traveling lane.

On the basis of the recognized position and speed of the host vehicle M and the position and speed of the nearby vehicle recognized by the external environment recognition unit 202, the host vehicle position recognition unit 204 may recognize a relative position and a relative speed between the host vehicle M and the nearby vehicle. The relative position may be, for example, the distance from the center of gravity of the host vehicle M to the center of gravity of the nearby vehicle. The relative speed may be, for example, the relative speed of the nearby vehicle with respect to the host vehicle M or may be an absolute value of the relative speed.

For example, the host vehicle position recognition unit 204 may recognize an adjacent lane adjacent to the host lane. For example, the host vehicle position recognition unit 204 recognizes a region between a lane marking closet to the host vehicle M next to the lane marking of the host lane and a lane marking of the host lane as an adjacent lane. In the example of FIG. 2, the host vehicle position recognition unit 204 recognizes a region between the lane marking LM2 of the host lane and the lane marking LM3 closest to the host vehicle M next to the lane marking LM2 as an adjacent right lane L2. Further, the host vehicle position recognition unit 204 may recognize a region between the lane marking LM3 and the lane marking LM4 closet to the host vehicle M next to the lane marking LM3 as an adjacent right lane L3.

For example, the following traveling support control unit 206 causes the host vehicle M to accelerate or decelerate in a range of a predetermined set speed (e.g., 50 to 100 [km/h]) by controlling the traveling driving force output device 300 and the brake device 310 so that the host vehicle M follows a nearby vehicle (hereinafter referred to as a preceding vehicle) located within a predetermined distance (e.g., about 50 [m]) in front of the host vehicle M among nearby vehicles recognized by the external environment recognition unit 202. "Follow" means, for example, a traveling mode in which a relative distance between the host vehicle M and the preceding vehicle (an inter-vehicle distance) is uniformly kept. The following traveling support control unit 206 may cause the host vehicle M to simply travel in the range of the set vehicle speed in a case that the preceding vehicle is not recognized by the external environment recognition unit 202.

The lane keeping support control unit 208 controls the steering device 320 so that the host lane recognized by the host vehicle position recognition unit 204 is kept. For example, the lane keeping support control unit 208 controls steering of the host vehicle M so that the host vehicle M travels in the center of the host lane.

The lane keeping support control unit 208 performs lane deviation prevention control in a case that the host vehicle M is traveling at a position deviated from the center of the host lane to either the left or the right. The lane deviation prevention control is driving support control for supporting the steering control so that the host vehicle M returns to the center of the host lane in a case that the host vehicle M tries to deviate from the host lane. As the lane deviation prevention control, for example, the lane keeping support control unit 208 calls the occupant's attention by vibrating the steering wheel in a case that the host vehicle M is close enough to the lane marking LM that a distance between a lane marking LM for marking the host lane and the host vehicle M is less than or equal to a predetermined distance. At this time, the HMI control unit 120 notifies the occupant that the host vehicle M is likely to deviate from the host lane by displaying images on various display devices of the HMI 20 or by outputting a sound or the like from the speaker. If the occupant does not operate the steering wheel after the steering wheel is vibrated (if the steering angle or the steering torque is less than a threshold value), the lane keeping support control unit 208 changes the orientation of the steerable wheels to the lane center side by controlling the steering device 320 and performs steering control so that the host vehicle M returns to the lane center side.

The lane change support control unit 210 includes, for example, a lane change availability determination unit 211, a control detail deriving unit 212, a parallel traveling state determination unit 213, and a lane change execution unit 214.

When the turn signal lever 40a is operated, the lane change availability determination unit 211 determines whether or not a lane change to a lane on the side of a turn signal that is activated in accordance with a lever operation (e.g., an adjacent right lane if the right turn signal is activated) in left and right turn signals of the host vehicle M is possible. For example, the lane change availability determination unit 211 determines that lane change is possible in a case that all the following conditions are satisfied and determines that lane change is not possible in a case that any condition is not satisfied. The lane change availability determination unit 211 may determine whether or not the lane change is possible in accordance with the presence or absence of an operation of the lane change start switch 22 in place of or in addition to the presence or absence of an operation of the turn signal lever 40a.

Condition (1): There are no obstacles in a lane of a lane change destination.

Condition (2): A lane marking LM for marking a space between a lane of the lane change destination and the host lane is not a road sign indicating prohibition of a lane change (prohibition of overtaking).

Condition (3): A lane of the lane change destination is recognized (existent).

Condition (4): A yaw rate detected by the vehicle sensor 30 is less than a threshold value.

Condition (5): A radius of curvature of the road on which the vehicle travels is greater than or equal to a predetermined value.

Condition (6): A speed of the host vehicle M is in a predetermined speed range.

Condition (7): Other driving support control having a higher priority than the steering support control for the lane change is not performed.

Condition (8): A predetermined time or more has elapsed after switching from the manual operation mode to the driving support mode.

[Determination method for condition (1)]

For example, in order to determine whether or not condition (1) is satisfied, the lane change availability determination unit 211 sets a target position serving as a lane change destination (hereinafter referred to as a lane change target position TAs) in the adjacent lane, and determines whether or not there are nearby vehicles that are obstacles at the lane change target position TAs.

Figure 3:
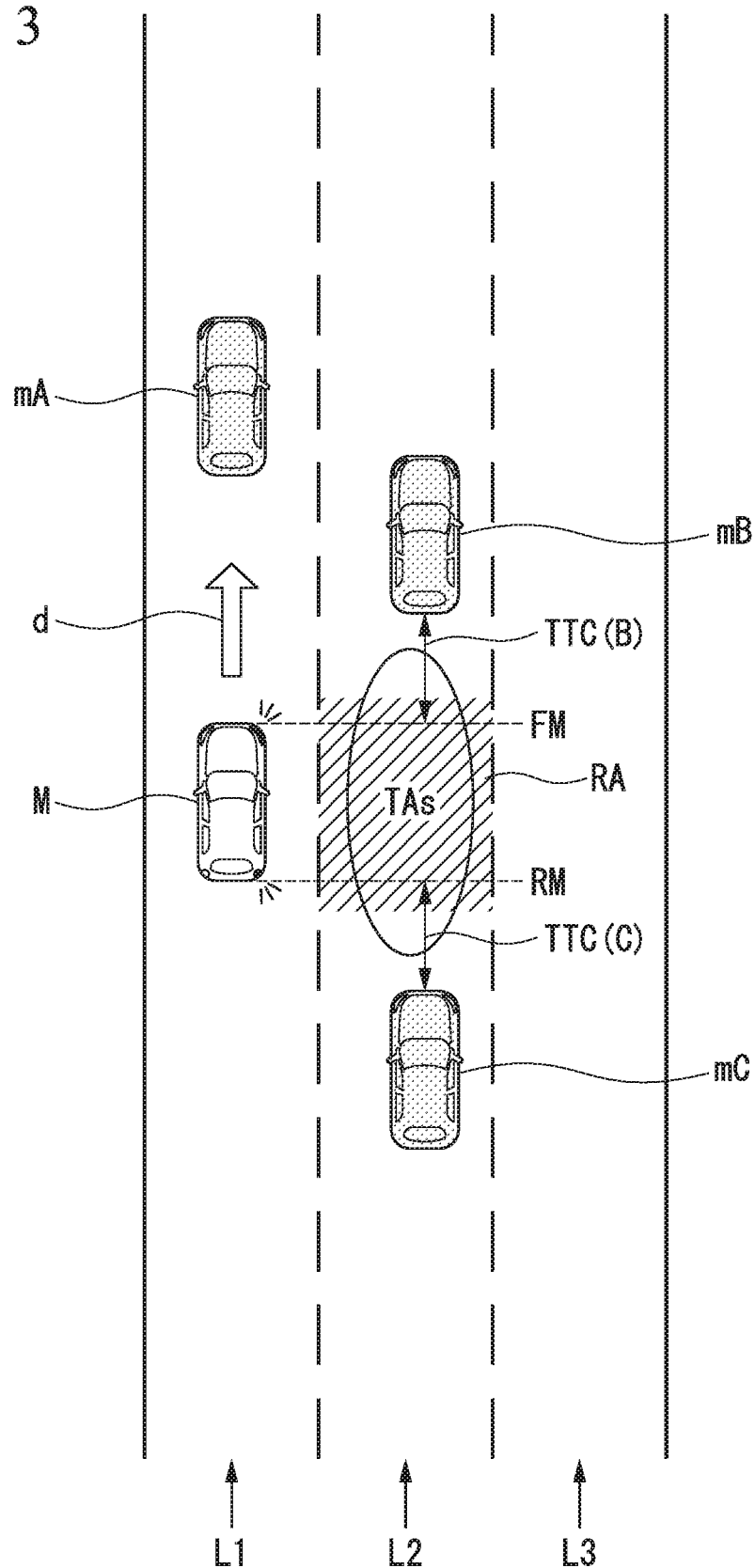
FIG. 3 is a diagram schematically showing a state in which a lane change target position is set to an adjacent lane.

FIG. 3 is a diagram schematically showing a state in which the lane change target position TAs is set in the adjacent lane. In FIG. 3, L1 represents a host lane (a first lane), L2 represents an adjacent right lane (a second lane) which is the lane change destination of the host vehicle M, and L3 represents an adjacent right lane (a third lane) before the adjacent right lane L2. Here, the third lane is an adjacent lane opposite the first lane when viewed from the second lane. An arrow d represents a running (traveling) direction of the host vehicle M. In the example of FIG. 3, there is a preceding vehicle mA in front of the host vehicle M.

Under such circumstances, for example, if an instruction for changing the lane to the adjacent right lane L2 is issued through an operation of the turn signal lever 40a, the lane change availability determination unit 211 selects any two vehicles (e.g., two vehicles relatively close to the host vehicle M) from among nearby vehicles located in the adjacent right lane L2 and sets the lane change target position TAs between the two selected nearby vehicles. For example, the lane change target position TAs is set at the center of the adjacent lane L2. Hereinafter, a nearby vehicle located immediately in front of the set lane change target position TAs is referred to as a "forward reference vehicle mB" and a nearby vehicle located immediately behind the lane change target position TAs is referred to as a "backward reference vehicle mC" for description. The lane change target position TAs is a relative position based on a positional relationship between the host vehicle M and the forward reference vehicle mB and the backward reference vehicle mC.

After the lane change target position TAs is set, the lane change availability determination unit 211 sets a prohibition region RA as illustrated in FIG. 3 on the basis of the set position of the lane change target position TAs. For example, the lane change availability determination unit 211 projects the host vehicle M onto the adjacent lane L2 of the lane change destination and sets a region having a slight buffer distance in front of and behind the projected host vehicle M as the prohibition region RA. The prohibition region RA is set as a region extending from one lane marking LM for partitioning the adjacent lane L2 to the other lane marking LM.

Then, the lane change availability determination unit 211 determines that condition (1) is satisfied if there are no nearby vehicles in the set prohibition region RA, a time-to-collision TTC(B) between the host vehicle M and the forward reference vehicle mB is greater than a threshold value Th(B), and a time-to-collision TTC(C) between the host vehicle M and the backward reference vehicle mC is greater than a threshold value Th(C). The fact that "there are no nearby vehicles in the prohibition region RA" means, for example, that the prohibition region RA does not overlap a region where a nearby vehicle is shown in a case that viewed from above. For example, the time-to-collision TTC(B) is derived by dividing a distance between an extension line FM obtained by virtually extending a front end of the host vehicle M to the adjacent lane L2 side and the forward reference vehicle mB by a relative speed between the host vehicle M and the forward reference vehicle mB. For example, the time-to-collision TTC(C) is derived by dividing a distance between an extension line RM obtained by virtually extending a rear end of the host vehicle M to the adjacent lane L2 side and the backward reference vehicle mC by a relative speed between the host vehicle M and the backward reference vehicle mC. The threshold values Th(B) and Th(C) may be the same value or different values.

In a case that condition (1) is not satisfied, the lane change availability determination unit 211 iteratively performs a process of determining whether or not condition (1) is satisfied by selecting two other vehicles from among the nearby vehicles located in the adjacent right lane L2 and newly setting the lane change target position TAs. At this time, the driving support control unit 200 may control the speed of the host vehicle M so that a current speed is kept until the lane change target position TAs that satisfies condition (1) is set or cause the host vehicle M to accelerate or decelerate so that the host vehicle M moves to the side of the lane change target position TAs.

If there are no nearby vehicles in the adjacent lane L2 in a case that the lane change target position TAs is set, the lane change availability determination unit 211 may determine that condition (1) is satisfied because there are no nearby vehicles which cause interference in the prohibition region RA. When there is only one nearby vehicle in the adjacent lane L2 in a case that the lane change target position TAs is set, the lane change availability determination unit 211 may set the lane change target position TAs at any position in front of or behind the nearby vehicle.

[Determination Method for Condition (2)]

For example, the lane change availability determination unit 211 determines whether or not condition (2) is satisfied in accordance with a lane marking between the host lane recognized by the host vehicle position recognition unit 204 and the adjacent lane of the lane change destination, i.e., a type of lane marking required to be crossed during a lane change. For example, the lane change availability determination unit 211 determines that condition (2) is not satisfied if the lane marking between the host lane and the adjacent lane of the lane change destination is a road sign indicating prohibition of lane change or prohibition of overtaking (e.g., a solid yellow line) and determines that condition (2) is satisfied if the lane marking is a road sign which does not indicate prohibition of lane change or prohibition of overtaking (e.g., a dashed white line).

[Determination Method for Condition (3)]

For example, when the turn signal lever 40a or the lane change start switch 22 is operated and a lane change instruction is issued, the lane change availability determination unit 211 determines that condition (3) is not satisfied if the lane indicated as the lane change destination is not recognized by the host vehicle position recognition unit 204. The lane change availability determination unit 211 determines that condition (3) is satisfied if the lane indicated as the lane change destination is recognized by the host vehicle position recognition unit 204. Thereby, for example, even in a case that an instruction for a lane change to a side where there is no adjacent lane due to an erroneous operation by the occupant is issued, the lane change is stopped because the host vehicle position recognition unit 204 does not recognize the lane indicated as the lane change destination.

[Determination Method for Condition (4)]

For example, the lane change availability determination unit 211 determines whether or not condition (4) is satisfied in accordance with whether or not the yaw rate detected by the vehicle sensor 30 is less than the threshold value. For example, this threshold value is set to a yaw rate of a degree to which an overload to the occupant (a case in which acceleration of a vehicle width direction is greater than or equal to the threshold value) does not occur in a case that the lane change is made. The lane change availability determination unit 211 determines that condition (4) is not satisfied if the yaw rate is greater than or equal to the threshold value and determines that condition (4) is satisfied if the yaw rate is less than the threshold value.

[Determination Method for Condition (5)]

For example, the lane change availability determination unit 211 determines whether or not condition (5) is satisfied in accordance with whether or not a radius of curvature of a road when the vehicle is traveling is greater than or equal to a predetermined value. For example, this predetermined value is set to a radius of curvature at which no overload is imposed on the occupant when the host vehicle M travels along the road (e.g., about 500 [m]). The predetermined value may be set to a smaller value (e.g., about 200 [m]) as the speed of the host vehicle M decreases and may be set to a larger value (e.g., about 1000 [m]) as the speed of the host vehicle M increases.

[Determination Method for Condition (6)]

For example, the lane change availability determination unit 211 determines whether or not condition (6) is satisfied in accordance with whether or not the speed of the host vehicle M is in a predetermined speed range. The predetermined speed range is set to, for example, a speed range of about 70 to 120 [km/h]. The lane change availability determination unit 211 determines that condition (6) is not satisfied if the speed of the host vehicle M is not in the predetermined speed range, and determines that condition (6) is satisfied if the speed of the host vehicle M is in the predetermined speed range.

[Determination Method for Condition (7)]

For example, the lane change availability determination unit 211 determines whether or not condition (7) is satisfied in accordance with whether or not other driving support control having a higher priority than the steering support control for a lane change is performed. For example, the driving support control having the highest priority is automatic braking for coping with an obstacle. For example, the lane change availability determination unit 211 determines that condition (7) is not satisfied if automatic brake control for coping with an obstacle is performed in a case that it is determined whether or not the lane change is possible and determines that condition (7) is satisfied if the automatic brake control for coping with an obstacle is not performed.

[Determination Method for Condition (8)]

For example, the lane change availability determination unit 211 determines whether or not condition (8) is satisfied in accordance with an elapsed time after the switching control unit 110 switches the operation mode of the host vehicle M from the manual operation mode to the driving support mode. For example, the lane change availability determination unit 211 determines that condition (8) is not satisfied if the predetermined time or more has not elapsed after switching to the driving support mode and determines that condition (8) is satisfied if the predetermined time or more has elapsed. This predetermined time is set to, for example, about 2 seconds. Thereby, the lane change can be started after the state of the host vehicle M is changed to a steady state under the driving support mode.

The lane change availability determination unit 211 may determine whether or not the lane change is possible sequentially regardless of whether or not the turn signal lever 40a or the lane change start switch 22 is operated. At this time, if both the adjacent left lane and the adjacent right lane are recognized (i.e., if there are two lanes where there is a possibility of a lane change), the lane change availability determination unit 211 determines whether or not the above-described condition is satisfied for each lane.

If the lane change availability determination unit 211 determines that the lane change is possible, the control detail deriving unit 212 determines control details for executing the lane change. The control details are, for example, information about a speed and a steering angle of the host vehicle M. For example, the control detail deriving unit 212 derives a target speed until the host vehicle M reaches the lane change target position TAs on the basis of a relative speed between the host vehicle M and the nearby vehicles in front of and behind the lane change target position TAs set by the lane change availability determination unit 211 (the forward reference vehicle mB and the backward reference vehicle mC) and a relative distance until the lane change target position TAs. The control detail deriving unit 212 derives a target steering angle until the host vehicle M reaches the lane change target position TAs on the basis of a relative distance in a vehicle running direction and a relative distance in a vehicle width direction until the lane change target position TAs is reached.

The control detail deriving unit 212 may derive maximum lateral acceleration and maximum lateral velocity during the lane change of the host vehicle M on the basis of the target speed and the target steering angle as control details. The control detail deriving unit 212 may include information of a predetermined time (hereinafter referred to as a standby time) until the lane change control is executed after the turn signal of the host vehicle M is activated as control details. In other words, the standby time is a time for notifying nearby vehicles of the intention of changing the lane of the host vehicle M.

For example, if the lane change of the host vehicle M is executed on the basis of the control details derived by the control detail deriving unit 212, the parallel traveling state determination unit 213 determines whether or not the host vehicle M and a nearby vehicle traveling in a lane adjacent to a lane change destination lane are in a parallel traveling state at a point in time in a case that the lane change is completed. For example, the parallel traveling state is a state in which positions of the host vehicle M and the nearby vehicle match in a running direction or are in a predetermined range (e.g., centers of gravity thereof are within a length of one vehicle) and running orientations thereof match.

On the basis of the control details derived by the control detail deriving unit 212, the parallel traveling state determination unit 213 derives a curve (e.g., a spline curve) asymptotically approaching the center line of the adjacent lane by using the current position and orientation of the host vehicle M as a base point and derives the derived curve as a target trajectory. The parallel traveling state determination unit 213 temporarily executes a lane change on the basis of the target trajectory and determines the position of the host vehicle M after the lane change is executed.

The parallel traveling state determination unit 213 acquires a relative position and a relative speed of the nearby vehicle with respect to the host vehicle M recognized by the external environment recognition unit 202 and the host vehicle position recognition unit 204 and determines the position of the nearby vehicle at a point in time when the lane change of the host vehicle M is completed on the basis of the acquired relative position and speed. The parallel traveling state determination unit 213 determines whether or not the host vehicle M and the nearby vehicle are in the parallel traveling state on the basis of the position of the host vehicle M and the position of the nearby vehicle at a point in time when the lane change is completed. Then, if there are a plurality of nearby vehicles traveling in a lane adjacent to a changed lane, the parallel traveling state determination unit 213 determines whether or not the host vehicle M and each nearby vehicle are in the parallel traveling state.

Figure 4:
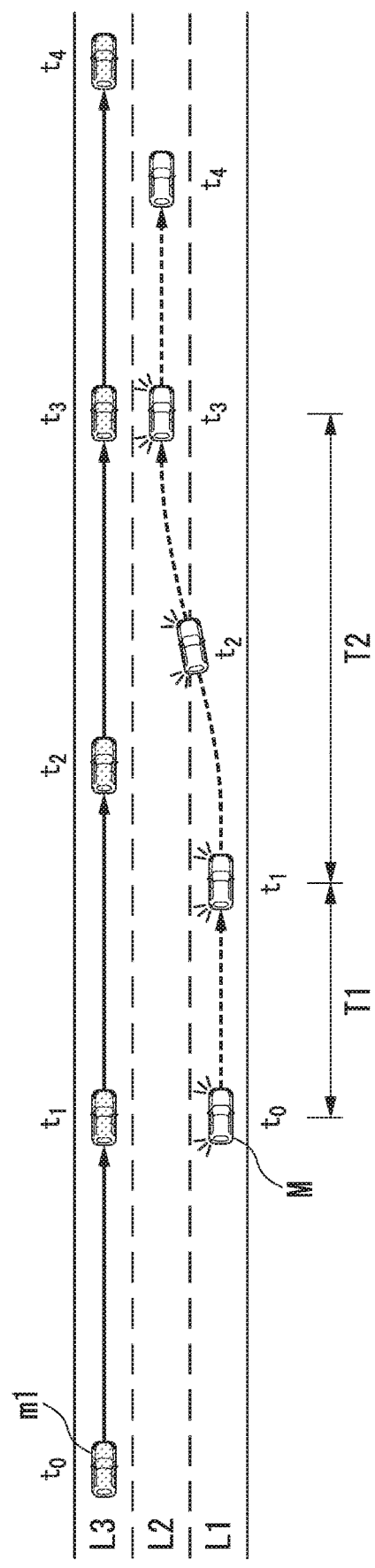
FIG. 4 is a diagram showing a state in which the host vehicle and a nearby vehicle are in a parallel traveling state in a case that the host vehicle temporarily executes a lane change.

FIG. 4 is a diagram showing a state in which the host vehicle M and a nearby vehicle m1 are in the parallel traveling state when the lane change is executed. In the example of FIG. 4, the host vehicle M and the nearby vehicle m1 traveling on expressways of three lane lines L1 to L3 (first to third lanes) are illustrated. In FIG. 4, traveling positions of the host vehicle M and the nearby vehicle m1 at times t0 to t4 are illustrated. In FIG. 4, a state in which the lane of the host vehicle M is changed from the first lane (the host lane) L1 to the second lane L2 according to lane change control is illustrated.

Time t0 of FIG. 4 represents a point in time at which the turn signal lever 40a is operated by the occupant. In this case, the turn signal of the host vehicle M starts to be activated. In the example illustrated in FIG. 4, the turn signal on the left side of the host vehicle M is activated and the lane change to the adjacent left lane L2 is indicated. A period from time $t_0$ to time $t_1$ in FIG. 4 represents a standby time T1. The host vehicle M continues flashing (blinking) of the turn signal while traveling along the host lane L1 is kept until the standby time T1 elapses.

A period from time $t_1$ to time $t_3$ in FIG. 4 is a steering control time T2 when the lane change is executed according to control details derived by the control detail deriving unit 212.

For example, at the timing when the turn signal is activated (time t0), the parallel traveling state determination unit 213 acquires a relative distance and a relative speed of the nearby vehicle m1 traveling in the third lane L3 through the external environment recognition unit 202 and the host vehicle position recognition unit 204 and calculates a position of the nearby vehicle m1 at times $t_1$ to $t_4$ when it is assumed that the nearby vehicle m1 has traveled in the same lane at a constant speed on the basis of the acquired relative distance and speed.

The parallel traveling state determination unit 213 compares the position of the host vehicle M at times $t_1$ to $t_4$ with the position of the nearby vehicle m1 at times $t_1$ to $t_4$ and determines whether or not the host vehicle M and the nearby vehicle m1 are in the parallel traveling state when the lane change of the host vehicle M based on control details is completed.

In the example of FIG. 4, the position and the direction of the host vehicle M match those of the nearby vehicle m1 at time $t_3$ when the lane change is completed. Therefore, the parallel traveling state determination unit 213 determines that the host vehicle M and the nearby vehicle m1 are in the parallel traveling state after the completion of the lane change based on the control details. If the position and the direction of the host vehicle M do not match those of the nearby vehicle m1 at time $t_3$ when the lane change is completed, the parallel traveling state determination unit 213 determines that the host vehicle M and the nearby vehicle m1 are not in the parallel traveling state.

If the parallel traveling state determination unit 213 determines that the host vehicle M and the nearby vehicle m1 are not in the parallel traveling state, the lane change execution unit 214 executes the lane change of the host vehicle M on the basis of control details derived by the control detail deriving unit 212. If the parallel traveling state determination unit 213 determines that the host vehicle M and the nearby vehicle m1 are in the parallel traveling state, the lane change execution unit 214 changes the control details derived by the control detail deriving unit 212 on the basis of a predetermined change pattern to different control details. The lane change execution unit 214 executes the lane change of the host vehicle M with the changed control details. Hereinafter, a state of the lane change based on a change pattern of the control details in the lane change execution unit 214 and the changed control details will be described below.

[First Change Pattern]

First, a first change pattern of control details will be described. The first change pattern is a change pattern of the control details in a case that an absolute value of the relative speed of the nearby vehicle m1 to the host vehicle M is greater than a predetermined speed. The predetermined speed is, for example, zero (0), but may include a predetermined error range (e.g., 0 to 5 [km/h]).

The lane change execution unit 214 changes the standby time T1 on the basis of the first change pattern in a case that the parallel traveling state determination unit 213 determines that the host vehicle M and the nearby vehicle m1 are in the parallel traveling state. Here, changing the standby time T1 involves adding or subtracting a predetermined time to or from the standby time T1. The predetermined time is, for example, a time set on the basis of the relative speed between the host vehicle M and the nearby vehicle m1. For example, the lane change execution unit 214 calculates a time in which a distance between the host vehicle M and the nearby vehicle m1 is greater than or equal to at least a length of one vehicle when the host vehicle M has completed the lane change on the basis of a relative speed difference between the host vehicle M and the nearby vehicle m1 and calculates a new standby time by adding or subtracting the calculated time to or from the standby time T1. The lane change execution unit 214 executes the lane change at the steering control time T2 on the basis of control details derived by the control detail deriving unit 212 when the changed standby time has elapsed.

Figure 5:
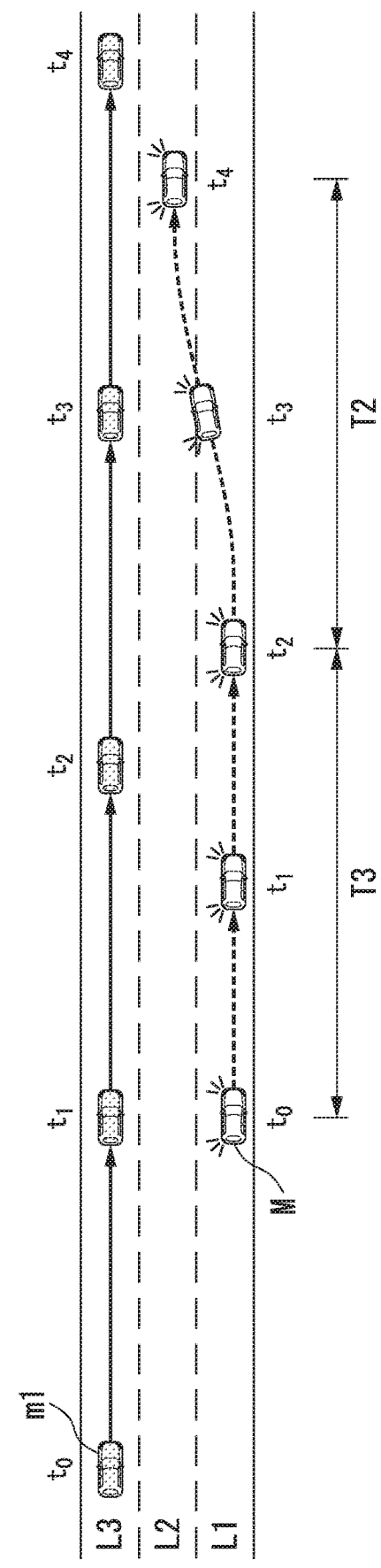
FIG. 5 is a diagram showing a state of a lane change based on a first change pattern.

FIG. 5 is a diagram showing a state of a lane change based on the first change pattern. In the example of FIG. 5, a state in which the host vehicle M changes lanes on the basis of control details changed according to the first change pattern in first to third lanes L1 to L3 and a state of traveling of the nearby vehicle m1 are illustrated.

For example, the lane change execution unit 214 extends the standby time T1 by a predetermined time and causes the host vehicle M to stand by at the first lane L1 for an extended standby time T3. The lane change execution unit 214 executes a lane change from the first lane L1 to the second lane L2 for the steering control time T2 at a point in time when time $t_2$ has been reached.

As described above, the lane change execution unit 214 shifts a lane change timing on the basis of the first change pattern, so that the host vehicle M and the nearby vehicle m1 can be set not to be in the parallel traveling state at time $t_4$ when the lane change of the host vehicle M is completed. Therefore, because vehicles do not approach each other so much even if the lane change is performed by the lane change control of the host vehicle M, a sense of security can be given to occupants of the host vehicle M and the nearby vehicle m1. Thereby, the host vehicle M can execute a lane change in consideration of a nearby vehicle or an occupant.

[Second Change Pattern]

Next, a second change pattern of control details will be described. The second change pattern is a change pattern of the control details in a case that an absolute value of the relative speed of the nearby vehicle m1 to the host vehicle M is less than or equal to the predetermined speed. When the absolute value of the relative speed is equal to or less than the predetermined speed, for example, an error of the relative speed is within about 5 [km/h]. In other words, the error of the relative speed is in a range around zero and is in a range which does not correspond to a condition of the above-described first change pattern. For example, even if the standby time T1 is changed according to the first change pattern in a case that the relative speed between the host vehicle M and the nearby vehicle m1 before execution of the lane change is zero and the host vehicle M and the nearby vehicle m1 are in a parallel traveling state, the host vehicle M and the nearby vehicle m1 are in the parallel traveling state when lane change is completed. Therefore, the lane change execution unit 214 changes the control details and extends the steering control time T2 as a result.

Figure 6:
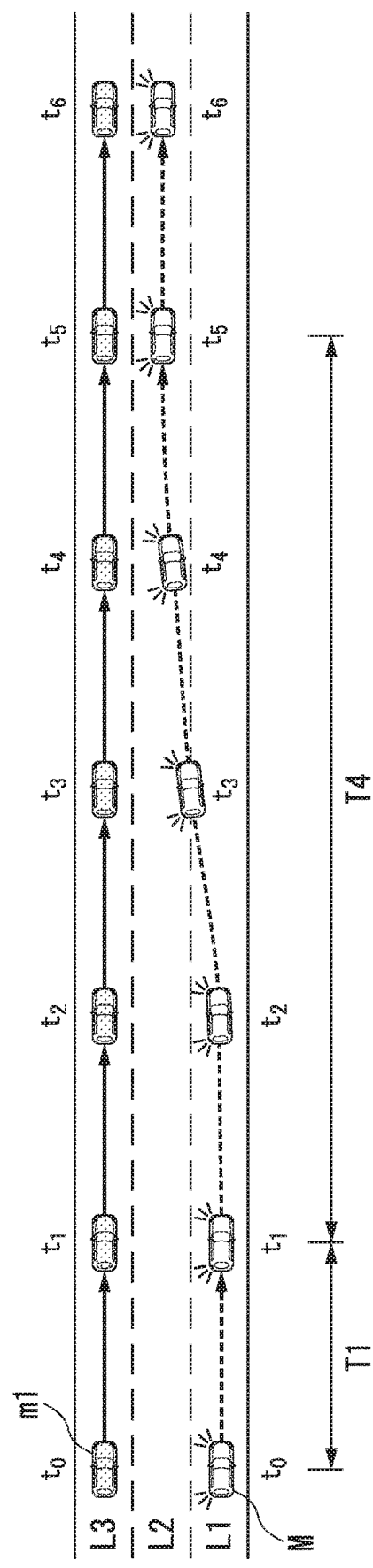
FIG. 6 is a diagram showing a state of a lane change based on a second change pattern.

FIG. 6 is a diagram showing a state of a lane change based on the second change pattern. Time to illustrated in FIG. 6 indicates a time at which activation of the turn signal has started. In the example of FIG. 6, the traveling positions of the vehicles at times (times $t_1$ to $t_6$) estimated from positions of the host vehicle M and the nearby vehicle m1 measured at time to are illustrated.

In the second change pattern, the lane change execution unit 214 changes control details derived by the control detail deriving unit 212 and executes the lane change in a steering control time T4 obtained by extending the steering control time T2. Specifically, the lane change execution unit 214 reduces maximum lateral acceleration or an upper limit value of the lateral speed of the host vehicle M during the lane change and the host vehicle M takes time to slowly change the lane to the second lane L2. For example, if the maximum lateral acceleration included in the control details derived by the control detail deriving unit 212 is 1.0 [m/s$^2$], the lane change execution unit 214 changes the maximum acceleration to 0.5 [m/s$^2$].

Because the host vehicle M takes time to change the lane on the basis of the control details changed according to the second change pattern, a sense of security can be given to the occupant of the host vehicle M and the nearby vehicle m1 because the host vehicle M slowly approaches the nearby vehicle m1 during the lane change even if the host vehicle M and the nearby vehicle m1 traveling in the adjacent lane are in the parallel traveling state at a point in time when the lane change of the host vehicle M has been completed. Thereby, the host vehicle M can execute a lane change in consideration of a nearby vehicle or an occupant.

[Third change Pattern]

Next, a third change pattern of control details will be described. The third change pattern is a change pattern of control details when an absolute value of the relative speed of the nearby vehicle m1 to the host vehicle M is less than or equal to the predetermined speed. In the third change pattern, the lane change execution unit 214 performs acceleration/deceleration control in the traveling direction of the host vehicle M so that the host vehicle M and the nearby vehicle m1 are not in the parallel traveling state at a point in time when the lane change of the host vehicle M has been completed.

Figure 7:
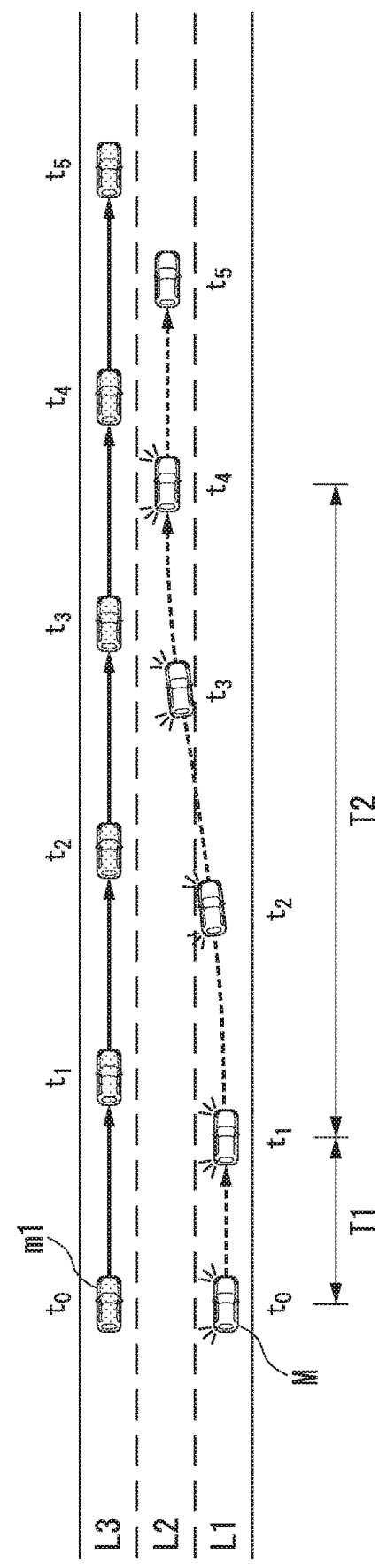
FIG. 7 is a diagram showing a state of a lane change based on a third change pattern.

FIG. 7 is a diagram showing a state of a lane change based on the third change pattern. Time $t_0$ illustrated in FIG. 7 indicates a time at which the activation of the turn signal has started. In FIG. 7, traveling positions for each vehicle at times $t_1$ to $t_5$ in a case that the lane change control is executed on the basis of the third change pattern are illustrated.

It is determined whether or not the lane change is possible at time to in a case that the activation of the turn signal has started and, for example, the lane change execution unit 214 executes deceleration control if it is determined that the lane change is possible and it is determined that the host vehicle M and the nearby vehicle m1 are in the parallel traveling state after the lane change is completed. For example, the lane change execution unit 214 starts weak deceleration control of about 0.1 [G] of longitudinal acceleration during the standby time T1, and starts the lane change execution at a point in time when the distance of a length of one vehicle or more has been secured. In the example of FIG. 7, the lane change control is executed because the distance of a length of one vehicle or more has been secured according to the deceleration control at a point in time when time $t_1$ has been reached. Thereby, the host vehicle M and the nearby vehicle m1 are not in a parallel traveling state at a point in time when time $t_4$, which is a lane change completion time, has been reached. Thereby, the host vehicle M can execute a lane change in consideration of a nearby vehicle or an occupant.

[Fourth Change Pattern]

Next, a fourth change pattern of control details will be described. In the fourth change pattern, the lane change execution unit 214 causes a traveling position in the lane width direction in the lane after the lane change of the host vehicle M to be offset to a position away from the nearby vehicle m1 by a predetermined distance on the basis of a center CL of the lane.

Figure 8:
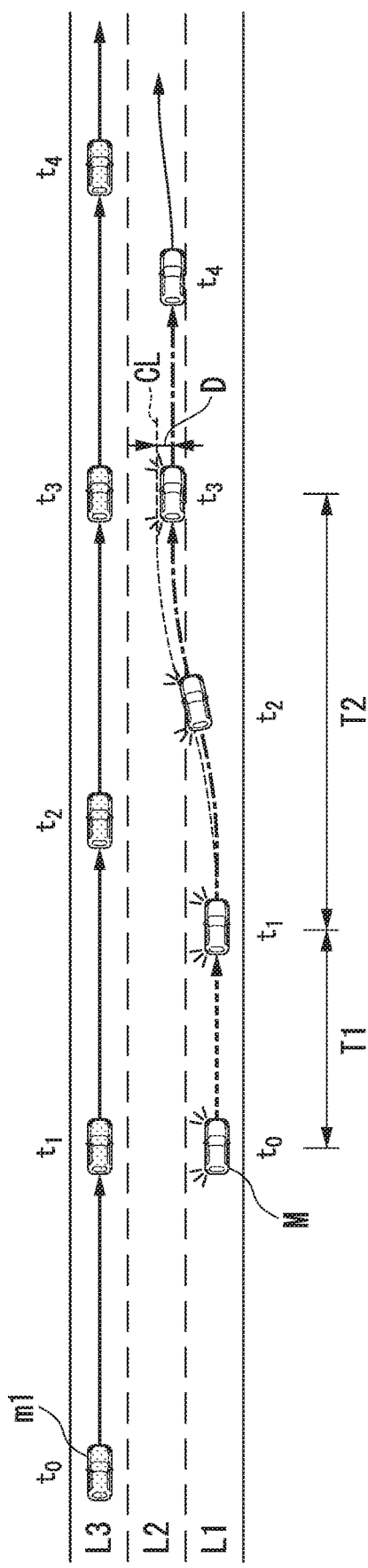
FIG. 8 is a diagram illustrating a state of a lane change based on a fourth change pattern.

FIG. 8 is a diagram showing a state of a lane change based on the fourth change pattern. In the fourth change pattern, the lane change execution unit 214 determines a target trajectory so that a position of the center of gravity of the host vehicle M at the time of lane change completion is offset to a position away from the nearby vehicle m1 by a distance D on the basis of the center CL of the second lane and executes the lane change of the host vehicle M on the basis of the determined target trajectory.

Thereby, even in a case that the host vehicle M and the nearby vehicle m1 are in the parallel traveling state when the lane change is completed at a point in time when time $t_3$ has been reached, it is possible to increase a distance between the host vehicle M and the nearby vehicle m1 according to an offset. Thus, the host vehicle M can execute a lane change in consideration of a nearby vehicle or an occupant.

For example, at time $t_4$ when a predetermined time has elapsed from the completion of the lane change, the host vehicle M can travel through the center of the second lane L2 according to lane deviation prevention control. In this case, because the host vehicle M and the nearby vehicle m1 are not in the parallel traveling state, the occupant of the host vehicle M does not care about the nearby vehicle m1 and the occupant of the nearby vehicle m1 does not care about the host vehicle M.

Each of the first to fourth change patterns described above may be combined with some or all of the other change patterns.

[Processing Flow]

Figure 9:
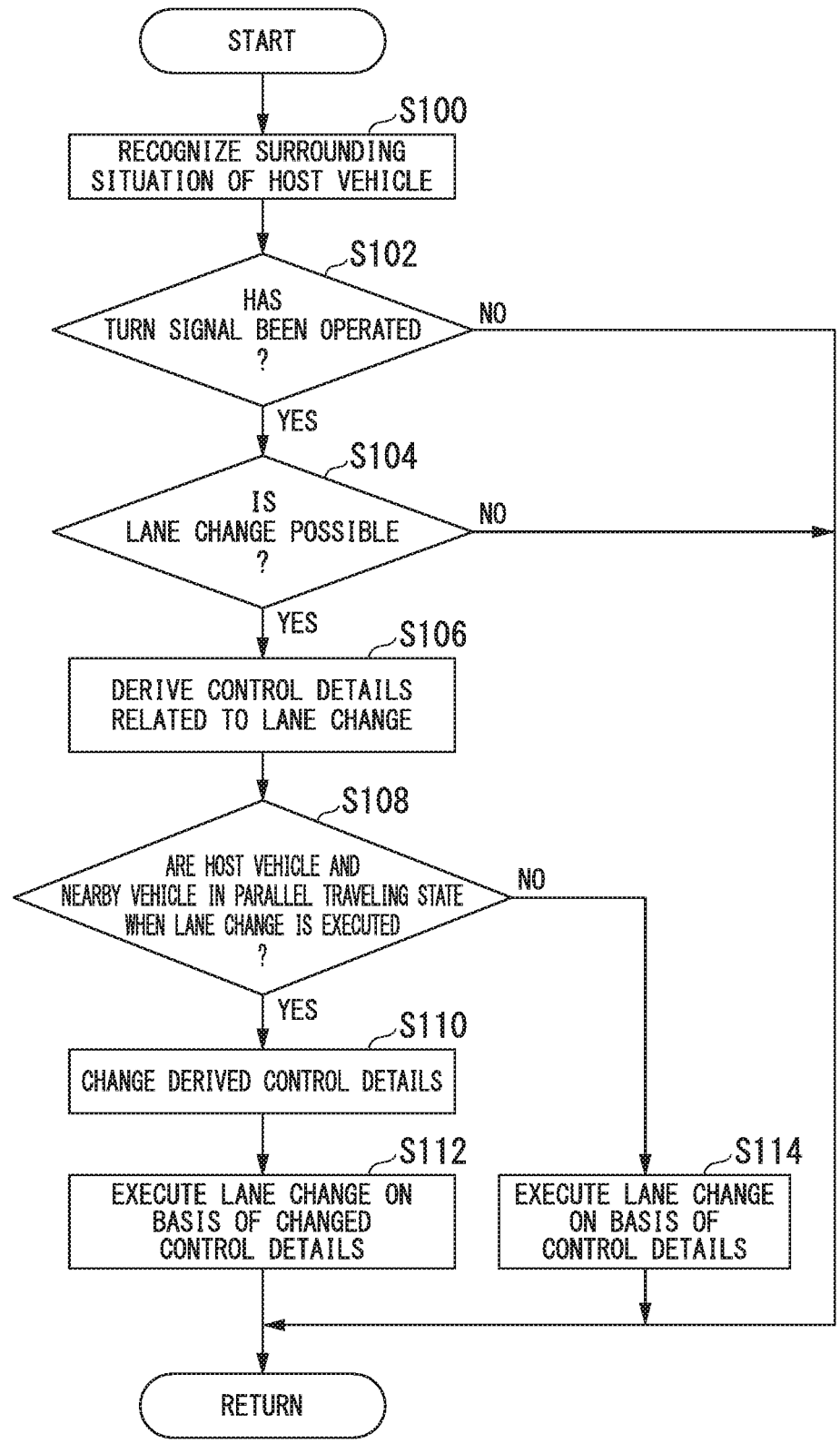
FIG. 9 is a flowchart showing an example of a flow of a lane change control process of an embodiment.

FIG. 9 is a flowchart showing an example of a flow of a lane change control process according to the embodiment. For example, the process of this flowchart may be iteratively executed in a predetermined cycle or at a predetermined timing at the time of execution of the driving support control in the embodiment. First, the external environment recognition unit 202 and the host vehicle position recognition unit 204 recognize a situation in the surroundings of the host vehicle M (step S100). In the processing of step S100, for example, a relative position and a relative speed of the nearby vehicle to the host vehicle M are recognized.

Next, the lane change availability determination unit 211 determines whether or not the turn signal has been operated (step S102). Specifically, the lane change availability determination unit 211 determines whether or not the turn signal lever 40a has been operated on the basis of a detection signal from the operation detection unit provided on the turn signal lever 40a. The lane change availability determination unit 211 may determine whether or not the lane change start switch 22 has been operated in place of or in addition to the turn signal lever 40a.

In a case that it is determined that the turn signal lever 40a has been operated or in a case that it is determined that the lane change start switch 22 has been operated, the lane change availability determination unit 211 determines whether or not a lane change to an adjacent lane at a side where the turn signal is activated is possible (step S104).

If it is determined that the lane change is possible, the control detail deriving unit 212 derives control details related to the lane change (step S106). Next, if the lane change is temporarily executed with the derived control details, the parallel traveling state determination unit 213 determines whether or not the host vehicle M and the nearby vehicle traveling in a lane adjacent to the traveling lane after the lane change are in a parallel traveling state (step S108).

In a case that it is determined that the host vehicle M and the nearby vehicle are in the parallel traveling state, the lane change execution unit 214 changes the control details of the host vehicle M derived by the control detail deriving unit 212 on the basis of at least one of the first to fourth change patterns (step S110). Then, the lane change execution unit 214 executes a lane change on the basis of the changed control details (step S112). If it is determined that the host vehicle M and the nearby vehicle are not in the parallel traveling state in the processing of step S108, the lane change is executed on the basis of the control details derived by the control detail deriving unit 212 (step S114). Thereby, the process of this flowchart is completed.

According to the above-described embodiment, in a case that driving support for the lane change is executed, it is possible to execute a lane change in consideration of a nearby vehicle or an occupant because control details of the lane change are changed in accordance with a result of determining whether or not the host vehicle and a nearby vehicle traveling in an adjacent lane after the lane change are in the parallel traveling state.

<Modified Example>

Although it is determined whether or not the host vehicle M and a nearby vehicle traveling in a third lane subsequent to a second lane are in a parallel traveling state in a case that the host vehicle M changes the lane from a first lane in which the host vehicle M is traveling to the second lane in the above-described embodiment, it may be determined whether or not the host vehicle M and the nearby vehicle traveling in the first lane in which the host vehicle M travels before the lane change are in the parallel traveling state in a case that the lane is changed and lane change control may be executed so that they are not in the parallel traveling state on the basis of a determination result.

In the above-described embodiment, a target trajectory may be derived so that the host vehicle M and the nearby vehicle are not in the parallel traveling state when the lane change is completed on the basis of a relative position and a relative speed of the nearby vehicle traveling in a third lane at a point in time when the target trajectory of the lane change of the host vehicle M in lane change control is derived.

For example, if it is necessary to perform the lane change for allowing the host vehicle M to travel along a route planned by an automatic driving system such as an event of overtaking another vehicle which is located in front of the host vehicle M and has a lower speed than the host vehicle M or an event of changing a route of the host vehicle M to a junction route or a branch route in a case that the host vehicle M travels along a preset route, the above-described embodiment can be applied even in a case that an operation of the turn signal lever 40a or the lane change start switch 22 by an occupant is performed in such an event.

<Hardware Configuration>

Figure 10:
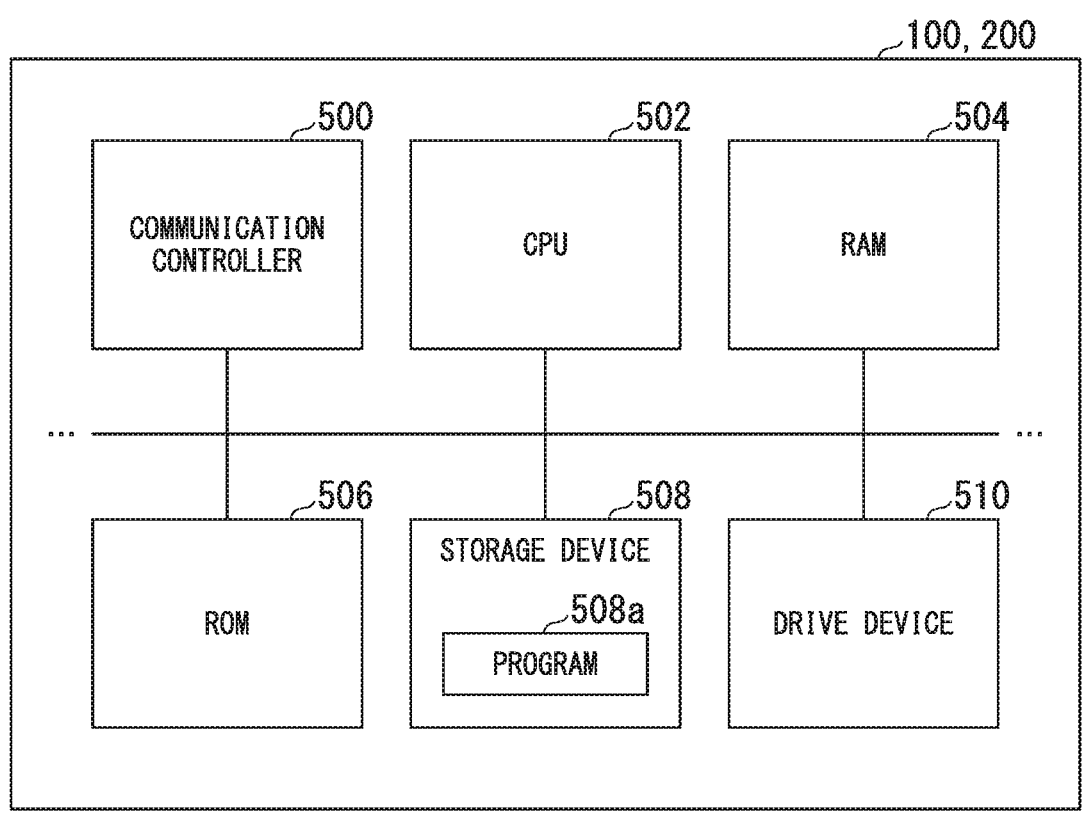
FIG. 10 is a diagram showing an example of a hardware configuration of a master control unit and a driving support control unit of an embodiment.

Each of at least the master control unit 100 and the driving support control unit 200 among a plurality of devices included in the vehicle control systems 1 and 2 of the above-described embodiment is implemented, for example, by a hardware configuration as illustrated in FIG. 10. FIG. 10 is a diagram showing an example of a hardware configuration of the master control unit 100 and the driving support control unit 200 according to the embodiment. The master control unit 100 and the driving support control unit 200 will be summarized and described below because a common hardware configuration can be applied.

Each of the master control unit 100 and the driving support control unit 200 is configured by mutually connecting a communication controller 500, a CPU 502, a random access memory (RAM) 504, a read only memory (ROM) 506, a storage device 508 such as a flash memory or an HDD, and a drive device 510 through an internal bus or a dedicated communication line. A portable storage medium such as an optical disc is mounted on the drive device 510. A program 508a stored in the storage device 508 or a program stored in a portable storage medium attached to the drive device 510 is loaded to the RAM 504 through a direct memory access (DMA) controller (not illustrated) or the like and executed by the CPU 502 to implement the functions of the master control unit 100 and the driving support control unit 200. For example, the program to be referred to by the CPU 502 may be downloaded from another device via a network such as the Internet.

The above-described embodiment can be represented as follows.

A vehicle control system, including:
a storage device configured to store information; and
a hardware processor configured to execute a program,
wherein the storage device stores the program for causing the hardware processor to execute a recognition process of recognizing a situation in the surroundings of a vehicle, a lane change control process of causing a lane of the vehicle to be changed from a first lane to a second lane without depending upon a steering operation of an occupant of the vehicle and a determination process of determining whether or not a nearby vehicle travelling in a lane adjacent to the second lane and the vehicle are in a parallel traveling state in a case that the lane of the vehicle is changed to the second lane in the lane change control process on the basis of the recognized situation in the surroundings recognized in the recognition process, and
wherein the lane change control process causes control details of the lane change for the vehicle to be different between a case in which it is determined that the nearby vehicle and the vehicle are in the parallel traveling state in the determination process and a case in which it is determined that the nearby vehicle and the vehicle are not in the parallel traveling state in the determination process.

Although modes for carrying out the present invention have been described above using embodiments, the present invention is not limited to these embodiments and various modifications and substitutions may be made without departing from the spirit of the present invention.

What is claimed is:

1. A vehicle control system for controlling a vehicle, comprising:
   a recognition unit configured to recognize a situation in the surroundings of a vehicle;
   a lane change control unit configured to cause a lane of the vehicle to be changed from a first lane to a second lane without depending upon a steering operation of an occupant of the vehicle; and
   a determination unit configured to determine whether or not a nearby vehicle travelling in a lane adjacent to the second lane and the vehicle are in a parallel traveling state in a case that the lane change control unit changes the lane of the vehicle to the second lane on the basis of the situation in the surroundings recognized by the recognition unit,
   wherein the lane change control unit controls a predetermined time from when a direction indicator of the vehicle is activated to when steering control of the vehicle is started based on a relative speed of the nearby vehicle with respect to the vehicle,
   wherein the lane change control unit controls a second predetermined time from when the first predetermined time elapses to when steering control of the vehicle is performed and lane change to the second lane is completed,
   wherein the lane change control unit changes the first predetermined time or the second predetermined in a case that the determination unit determines that the nearby vehicle and the vehicle are in the parallel traveling state.

2. The vehicle control system according to claim 1, wherein the lane adjacent to the second lane is an adjacent third lane opposite the first lane when viewed from the second lane.

3. The vehicle control system according to claim 1,
   wherein the recognition unit recognizes the relative speed of the nearby vehicle with respect to the vehicle, and
   wherein the lane change control unit calculates a time required to make a distance between the vehicle and the nearby vehicle greater than or equal to at least a length of one vehicle based on the relative speed when the vehicle has completed the lane change and calculates a new first predetermined time by adding the calculated time to the first predetermined time or by subtracting the calculated time predetermined time
   in a case that an absolute value of the relative speed is greater than a predetermined speed.

4. The vehicle control system according to claim 1,
   wherein the recognition unit recognizes the relative speed of the nearby vehicle with respect to the vehicle, and
   wherein the lane change control unit makes the second predetermined time longer than the second predetermined time when the relative speed is greater than the predetermined speed in a case that an absolute value of the relative speed is equal to or less than a predetermined speed and the determination unit determines that the vehicle and the nearby vehicle are in the parallel traveling state.

5. The vehicle control system according to claim 1,
   wherein the lane change control unit changes a traveling position related to a lane width direction in the second lane after a lane change of the vehicle controlled by the lane change control unit in a case that the determination unit determines that the vehicle and the nearby vehicle are in the parallel traveling state to a position further from the nearby vehicle than in a case that the determination unit determines that the vehicle and the nearby vehicle are not in the parallel traveling state.

6. The vehicle control system according to claim 1,
   wherein the lane change control unit makes lateral acceleration caused due to the lane change in a case that the determination unit determines that the vehicle and the nearby vehicle are in the parallel traveling state less than lateral acceleration caused due to the lane change in a case that the determination unit determines that the vehicle and the nearby vehicle are not in the parallel traveling state.

7. The vehicle control system according to claim 6,
wherein the recognition unit recognizes a relative speed between the vehicle and the nearby vehicle, and
wherein the lane change control unit makes the lateral acceleration in a case that an absolute value of the relative speed is less than or equal to a predetermined speed less than the lateral acceleration in a case that the determination unit determines that the vehicle and the nearby vehicle are not in the parallel traveling state.

8. The vehicle control system according to claim 1,
wherein the lane change control unit changes the lane of the vehicle from the first lane to the second lane at a predetermined speed according to speed control for the vehicle and causes a speed related to a traveling direction during the lane change in a case that the determination unit determines that the vehicle and the nearby vehicle are in the parallel traveling state to be different from a speed in a case that the determination unit determines that the vehicle and the nearby vehicle are not in the parallel traveling state.

9. The vehicle control system according to claim 8,
wherein the recognition unit recognizes a relative speed between the vehicle and the nearby vehicle, and
wherein the lane change control unit makes a speed of the vehicle during the lane change in a case that an absolute value of the relative speed is less than or equal to a predetermined speed less than a speed of the vehicle in a case that the determination unit determines that the vehicle and the nearby vehicle are not in the parallel traveling state.

10. A vehicle control method, comprising:
recognizing, by an in-vehicle computer, a situation in the surroundings of a vehicle;
changing, by the in-vehicle computer, a lane of the vehicle from a first lane to a second lane without depending upon a steering operation of an occupant of the vehicle;
determining, by the in-vehicle computer, whether or not a nearby vehicle travelling in a lane adjacent to the second lane and the vehicle are in a parallel traveling state in a case that the lane of the vehicle is changed to the second lane on the basis of the recognized situation in the surroundings;
controlling, by the in-vehicle computer, a first predetermined time from when a direction indicator of the vehicle is activated to when steering control of the vehicle is started, based on a relative speed of the nearby vehicle with respect to the vehicle;
controlling, by the in-vehicle computer, a second predetermined time from when the first predetermined time elapses to when steering control of the vehicle is performed and lane change to the second lane is completed; and
changing, by the in-vehicle computer, the first predetermined time or the second predetermined time in a case that it is determined that the nearby vehicle and the vehicle are in the parallel traveling state.

11. A non-transitory computer-readable storage medium storing a program for causing an in-vehicle computer to:
recognize a situation in the surroundings of a vehicle;
change a lane of the vehicle from a first lane to a second lane without depending upon a steering operation of an occupant of the vehicle;
determine whether or not a nearby vehicle travelling in a lane adjacent to the second lane and the vehicle are in a parallel traveling state in a case that the lane of the vehicle is changed to the second lane on the basis of the recognized situation in the surroundings;
control a first predetermined time from when a direction indicator of the vehicle is activated to when steering control of the vehicle is started, based on a relative speed of the nearby vehicle with respect to the vehicle;
control a second predetermined time from when the first predetermined time elapses to when steering control of the vehicle is performed and lane change to the second lane is completed; and
change the first predetermined time or the second predetermined time in a case that it is determined that the nearby vehicle and the vehicle are in the parallel traveling state.

\* \* \* \* \*